(12) United States Patent
Gargash et al.

(10) Patent No.: US 12,491,451 B2
(45) Date of Patent: Dec. 9, 2025

(54) EVAPORATION UNIT FOR A BRINE RECYCLING PLANT

(71) Applicants: Abdul Jabbar Abdulla Ali Gargash, Dubai (AE); Mahmoud Ayoub, Dubai (AE)

(72) Inventors: Abdul Jabbar Abdulla Ali Gargash, Dubai (AE); Mahmoud Ayoub, Dubai (AE)

( * ) Notice: Subject to any disclaimer, the term of this patent is extended or adjusted under 35 U.S.C. 154(b) by 0 days.

(21) Appl. No.: 18/262,735

(22) PCT Filed: Feb. 16, 2022

(86) PCT No.: PCT/IB2022/051372
§ 371 (c)(1),
(2) Date: Jul. 25, 2023

(87) PCT Pub. No.: WO2022/254259
PCT Pub. Date: Dec. 8, 2022

(65) Prior Publication Data
US 2024/0424422 A1 Dec. 26, 2024

(51) Int. Cl.
*C02F 1/08* (2023.01)
*B01D 1/06* (2006.01)
*C02F 1/04* (2023.01)

(52) U.S. Cl.
CPC .............. *B01D 1/065* (2013.01); *C02F 1/043* (2013.01); *C02F 1/08* (2013.01)

(58) Field of Classification Search
CPC . B01D 1/06; B01D 1/065; B01D 1/08; B01D 1/10; B01D 1/12; C02F 1/043; C02F 1/08
See application file for complete search history.

(56) References Cited

U.S. PATENT DOCUMENTS

| | | | | |
|---|---|---|---|---|
| 995,776 A | * | 6/1911 | Dunn ...................... | B01D 1/12 122/34 |
| 2,613,176 A | * | 10/1952 | Goldsbarry ............ | B01D 1/222 202/205 |

(Continued)

FOREIGN PATENT DOCUMENTS

| CN | 205590313 U | * | 9/2016 |
|---|---|---|---|
| CN | 110038315 A | * | 7/2019 |

(Continued)

OTHER PUBLICATIONS

English lnaguage machine translation of CN-110038315-A obtained from PE2E.*

(Continued)

*Primary Examiner* — Jonathan Luke Pilcher
(74) *Attorney, Agent, or Firm* — Patshegen IP; Moshe Pinchas (57) ABSTRACT

The present invention relates to brine recycling plants with improved evaporation systems. A brine recycling plant comprises a brine tank (30;31), an evaporation container (300) fluidly connected to the brine tank (30;31). The evaporation container (300) comprises evaporation units (200). Each evaporation unit (200) comprises three concentrically arranged tubes (19;20;21) and an evaporation head (36) arranged on a one end of the evaporation unit (200) and configured so that the brine is collectable in the evaporation head (36) and directable along walls of the tubes (19;20;21). The evaporation container (300) further comprises a fan (23) configured to maintain the negative pressure within the evaporation container (300) so that an air flow between the concentrically arranged tubes (19;20;21) of the evaporation unit (200) is maintained. Said evaporation container (300) provides effective evaporation increasing overall effectiveness of the brine recycling plant.

6 Claims, 7 Drawing Sheets

(56) References Cited

U.S. PATENT DOCUMENTS

| | | | | |
|---|---|---|---|---|
| 4,925,526 A | * | 5/1990 | Havukainen | B01D 1/065 |
| | | | | 159/901 |
| 7,588,666 B2 | * | 9/2009 | Saifutdinov | B01D 1/065 |
| | | | | 203/1 |

FOREIGN PATENT DOCUMENTS

| | | | | | |
|---|---|---|---|---|---|
| CN | | 112807721 A | * | 5/2021 | |
| RU | | 2280011 C1 | * | 7/2006 | |
| WO | WO-2016159625 A1 | * | 10/2016 | | C02F 1/04 |

OTHER PUBLICATIONS

English lnaguage machine translation of CN-112807721-A obtained from PE2E.*
English lnaguage machine translation of CN-205590313-U obtained from PE2E.*
English lnaguage machine translation of RU-2280011-C1 obtained from PE2E.*
English lnaguage machine translation of WO-2016159625-A1 obtained from PE2E.*

* cited by examiner

EVAPORATION UNIT FOR A BRINE RECYCLING PLANT

FIELD OF THE INVENTION

The present invention relates to evaporation units for brine recycling plants.

BACKGROUND OF THE INVENTION

Brine is a high-concentration solution of salt (NaCl) in water (H2O). It is also a by-product of many industrial processes, such as desalination, so it requires wastewater treatment for proper disposal or further utilization (fresh water recovery). Brine is also a byproduct of following industrial processes: power plant cooling, oil and natural gas extraction, acid mine or acid rock drainage, reverse osmosis reject, chlor-alkali wastewater treatment, pulp and paper mill effluent, and waste streams from food and beverage processing.

Technologies for treatment of polluted brine include: membrane filtration processes, such as reverse osmosis and forward osmosis; ion exchange processes such as electro dialysis or weak acid cation exchange; or evaporation processes, such as thermal brine concentrators and crystallizers employing mechanical vapour recompression and steam.

Aforementioned technologies are disclosed in Russian patent publications Nos. RU2603799 and RU2613920, as well as in U.S. patent application publication No. U.S. Pat. No. 20,111,98208 and Australian patent application publication No. AU2018383041. Water desalination plants using renewable energy sources are disclosed in Utility model registration publications Nos. CN204625232U and CN204661346U.

Aim of the invention is to design a brine recycling plant having effective desalination process, as well as having zero return. The zero return means that no processed brine is discharged from the brine recycling plant back into the environment.

SUMMARY OF THE INVENTION

The brine recycling plant comprises three main units: a brine tank; evaporation container for obtaining a saturated water vapour and a salt separation unit for obtaining crystalized salt or any other mineral within the processed liquid. The main object of the invention is increasing evaporation efficiency in the evaporation container. The aim is reached by design of new type of an evaporation unit utilizing falling film evaporation.

The evaporation container comprises a frame and a cover enclosing an inner volume of the evaporation container. A standard maritime container may be used as an enclosure of the evaporation container. The evaporation container further comprises a holding plate positioned in an upper part of the evaporation container. The evaporation container is configured to receive a brine on its holding plate.

The evaporation container is characterized in that it comprises multiple evaporation units installed in the holding plate of the evaporation container. Each evaporation unit comprises three concentrically arranged tubes—an inner tube, an intermediate tube and an outer tube—and an evaporation head installed on one end of said three concentrically arranged tubes. The evaporation head is a part of the evaporation unit that is installed in the holding plate of the evaporation container.

The evaporation head comprises connectors configured to hold all three concentrically arranged tubes by one of its ends and provide concentric arrangement. The connectors are integral part of the evaporation head. The evaporation head also comprises brine inlets positioned around the evaporation head so that the brine on the holding plate can flow into the evaporation head and further down along the surfaces of the tubes, especially along the inner and outer surfaces of the inner tube and the inner and outer surfaces of the intermediate tube and along the inner surface of the outer tube. In order to facilitate effective air flow within three concentrically arranged tubes the evaporation unit comprises a central pipe air inlet extending through the evaporation head so that the air can flow through the evaporation head and further into the inner tube; an intermediate pipe air inlet extending through the evaporation head so that the air can flow through the evaporation head and further into the intermediate tube; and an outer pipe air inlet extending through the evaporation head so that the air can flow through the evaporation head and further into the outer tube.

The evaporation container is also characterized in that it comprises a built in fan. The fan is configured to maintain the pressure within the inner volume of the evaporation container in the range of 180 to 300 Pa to maintain the air flow in the gaps between the concentrically arranged tubes of the evaporation unit to facilitate evaporation of a water in the brine.

In addition the evaporation unit comprises flow stabilizing rings. The flow stabilizing rings may be arranged on the inner surface of the outer tube, on the outer surface and on the inner surface of the intermediate tube, and on the outer surface and on the inner surface of the inner tube.

The diameter of the inner tube may be in the range of 30 to 50 mm, the diameter of the intermediate tube may be the range of 70 to 90 mm and the diameter of the outer tube may be in the range of 100 to 120 mm. In a preferred embodiment, the diameter of the inner tube is 43 mm, the diameter of the intermediate tube is 83 mm and the diameter of the outer tube is 110 mm. The length of the evaporation unit and its respective inner tube, intermediate tube and the outer tube may be range of 1.5 m to 2.5 m.

In another embedment of the invention the evaporation container may comprise a inclined container floor for facilitating a drainage of the brine that drops from the evaporation units so that excess brine can be fed out from the evaporation container.

The evaporation container is fluidly connected to the brine tank or tanks so that the brine can flow from the brine tank to the evaporation container. The brine recycling plant additionally may comprise one or more brine tanks configured to contain a brine or any other solution or liquid for processing. The flow of the brine is supported by pumps. The evaporation container comprises two main elements: evaporation unit and a fan. The evaporation unit comprises three concentrically arranged tubes and an evaporation head arranged on a one end of the evaporation unit and configured so that the brine is collectable in the evaporation head and directable along walls of the tubes, especially along the inner and outer surfaces of the inner tube and intermediate tube and along the inner surface of the outer tube. The design of the evaporation head allows the air to flow tangentially over the brine film to increase the evaporation. The evaporation unit is arranged vertically within the evaporation container so that the brine flow and an air flow is directed parallel and downwards. The fan is configured to maintain a negative pressure within the evaporation container. This negative pressure may be maintained in the range of 180 to 300 Pa so that the air flow is provided in gaps between the concentrically arranged tubes of the evaporation unit. Kinetic energy of the air is used to increase evaporation.

Evaporated water from the evaporation container is further condensed outside the evaporation container, for example, by means of a heat exchanger and a fresh water is obtained.

The salt separation unit is fluidly connected to evaporation container so that the brine can flow from the evaporation container to the salt separation unit. The salt separation unit comprises a rotating drum, a brine feed pipe, a conveyor belt and a brine collection tank. The brine feed pipe is arranged within the rotating drum so that the brine is fed into the rotating drum. The conveyor belt is arranged within the rotating drum in the middle area thereof so that the crystalized salt is transferred from the rotating drum to the conveyor belt and outside from the salt separation unit for collection. In result the salt or any other crystalized matter is obtained. The brine collection tank is positioned underneath the rotating drum so that the brine that went through the rotating drum can be collected. The brine collection tank is fluidly connected to the brine tank and to the evaporation container providing a fully functional brine or fluid recirculation system.

No processed brine is discharged back into the environment-into the sea or into the ground. The plant is self sufficient zero waste or zero return brine recycling plant.

The present invention may be used for extracting salts, as well as metals and minerals and other particle matter out of the brine.

BRIEF DESCRIPTION OF THE DRAWINGS

The drawings illustrate generally, by way of example, but not by way of limitation, various embodiments of the invention.

DETAILED DESCRIPTION OF THE EMBODIMENTS

The preferred embodiments of the invention are now described with reference to the figures to illustrate objectives, advantages, and efficiency of the present invention.

Figure 1:
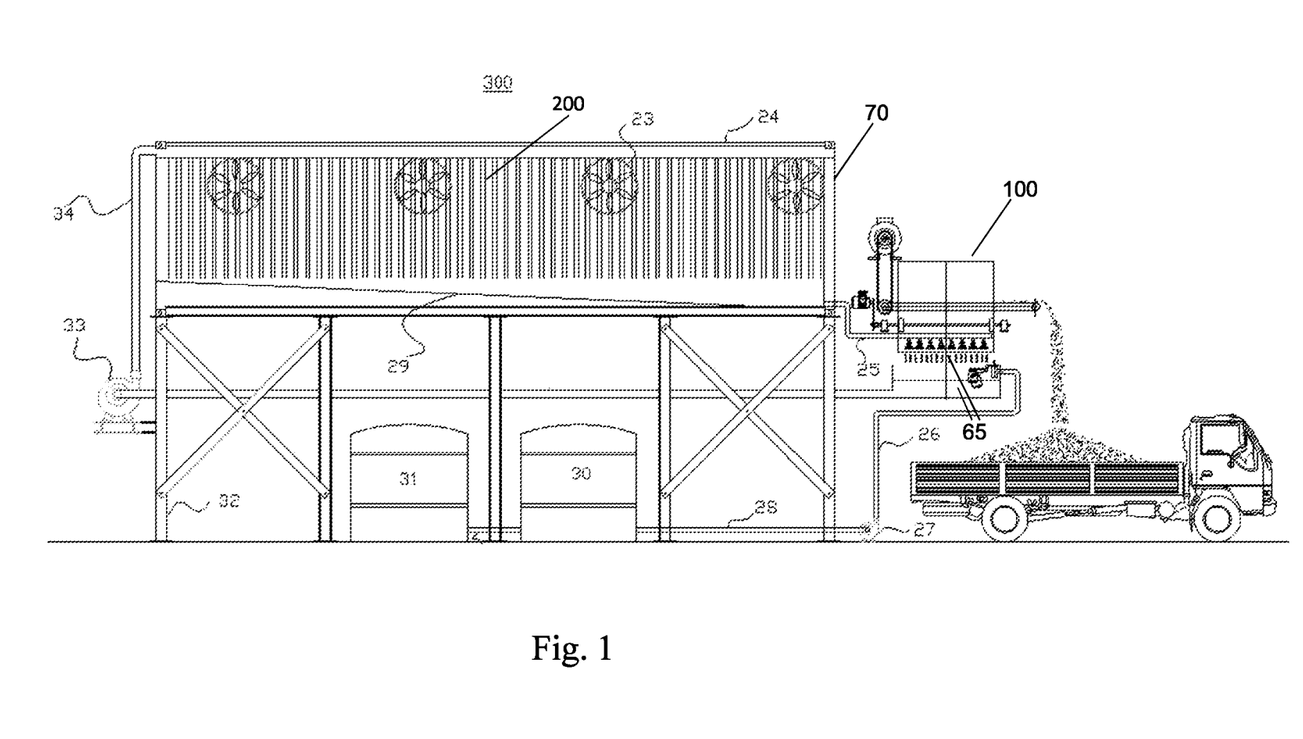
FIG. 1 is a schematic view of a brine recycling plant.
Figures 2A, 2B, 2C:
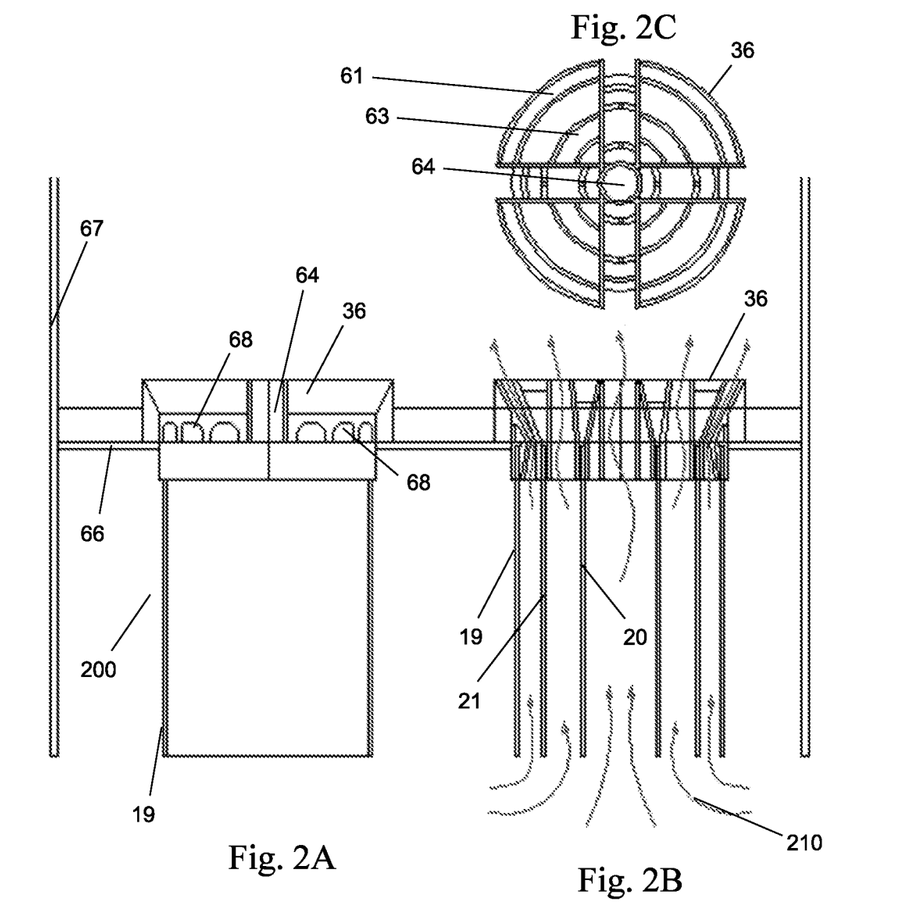
FIG. 2A illustrates an evaporation unit (200) mounted in a rack (201).
FIG. 2B is a cross section of the evaporation unit (200) as seen in FIG. 2A.
FIG. 2C is a top view of the evaporation unit (200) as seen in FIGS. 2A and 2B.
Figure 3A:
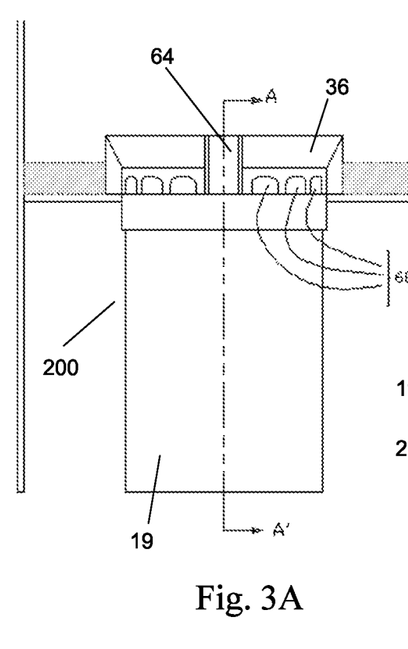
FIG. 3A illustrates an evaporation unit (200) mounted in a rack (201) as seen in FIGS. 2A to 2C with addition of brine (65) and illustration of its flow.
Figure 3B:
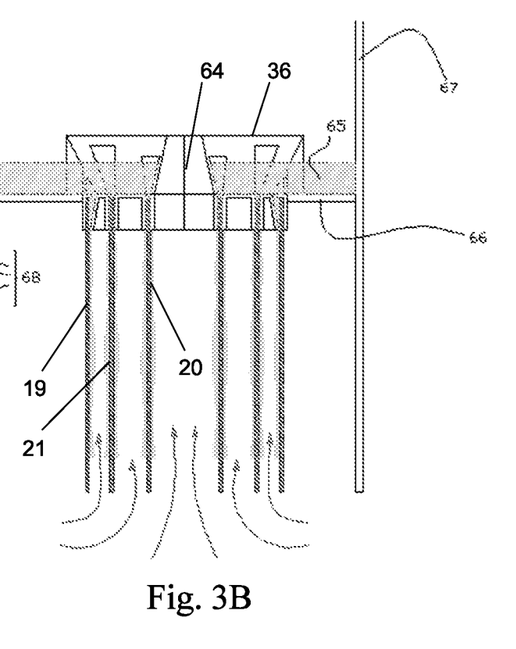
FIG. 3B is a cross section of the evaporation unit (200) as seen in FIG. 3A.
Figure 4:
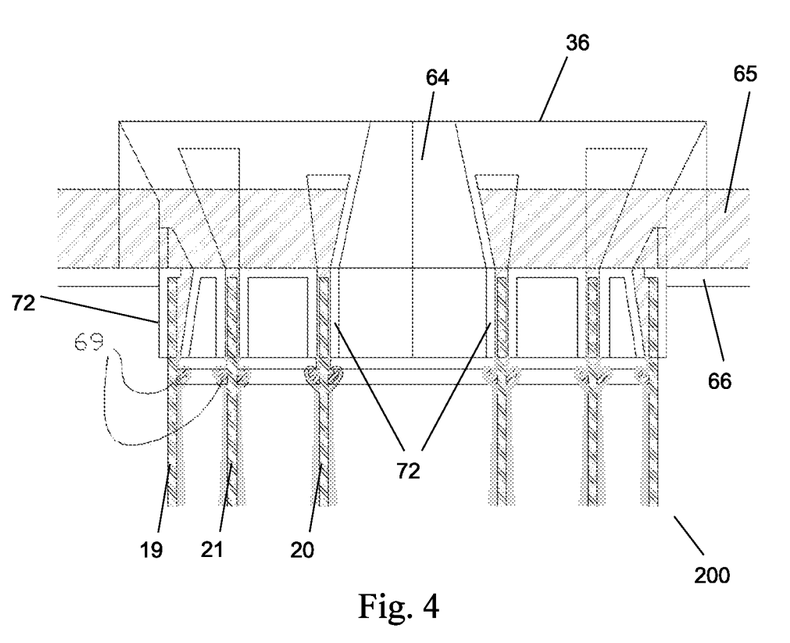
FIG. 4 is a cross section of another embodiment of the evaporation unit (200) illustrating flow stabilizing rings (69).
Figure 5:
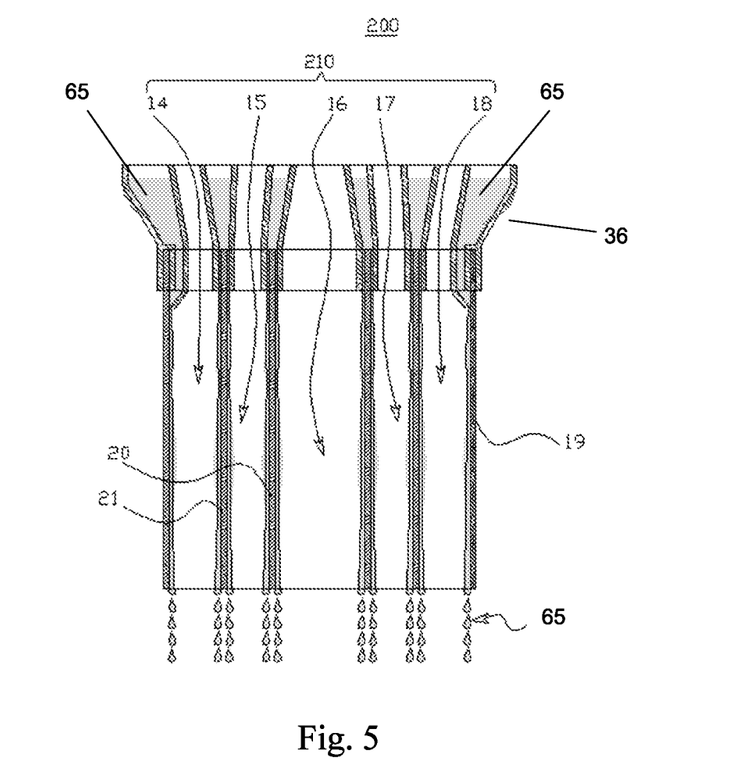
FIG. 5 is a cross section view of another embodiment of an evaporation unit (200) illustrating a flow of a brine (65).
Figure 6:
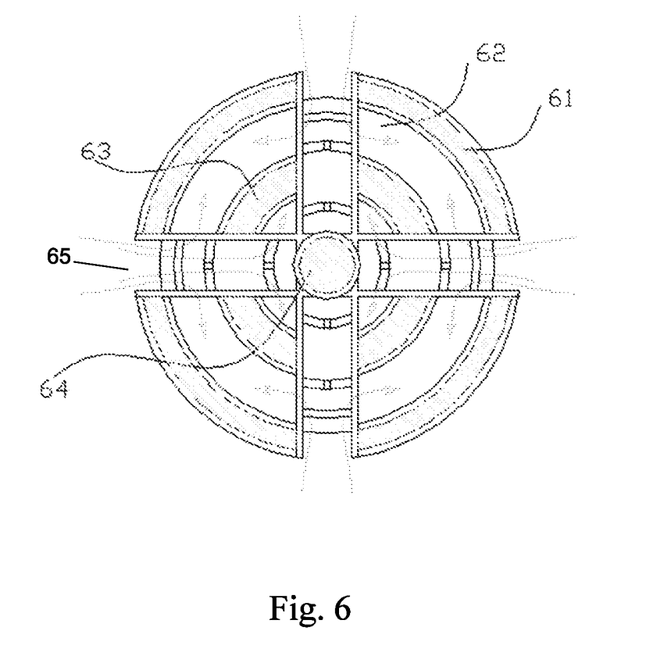
FIG. 6 is a top view of an evaporation head (36).

FIG. 1 illustrates overall schematics of a brine recycling plant. The brine recycling plant comprises a brine tank (30; 31) configured to contain a brine (65) and fluidly connected to the evaporation container (300) so that the brine (65) can flow from the brine tank (30; 31) to the evaporation container (300). The brine recycling plant further comprises a salt separation unit (100) fluidly connected to the evaporation container (300) so that the brine (65) can flow from the evaporation container (300) to the salt separation unit (100) via a brine feed pipe (25). The brine (65) which have not been processed in the salt separation unit (100) is circled back to the evaporation container (300) or to the brine tank (30; 31). The evaporation container (300) comprises multiple evaporation units (200) for evaporation of the brine (65) and fans (23) for providing an air flow along and within the evaporation units (200). The evaporation container (300) comprises an inclined container floor (29) facilitating a drainage of the brine (65) that drops from the evaporation units (200).

An evaporation container (300) comprises a frame (67) and an enclosure (70) enclosing an inner volume of the evaporation container (300). The evaporation container (300) further comprises a holding plate (66) positioned in an upper part of the evaporation container (300) and configured to receive a brine (65).

The brine (65) is fed from the brine tank (30; 31) to the evaporation container (300) through a brine feed pipe (26; 28) and a recirculation pipe (34) with an assistance of a brine feed pump (27) and a recirculation pump (33) (see FIG. 1).

FIG. 1 illustrates an embodiment of the invention where the brine tanks (30; 31) are positioned bellow the evaporation container (300) and the evaporation container (300) itself is arranged on a frame support structure (32).

Each evaporation unit (200) (see FIGS. 2A to 6) comprises three concentrically arranged tubes (19; 20; 21)—an inner tube (20), an intermediate tube (21) and an outer tube (19). Each evaporation unit (200) also comprises an evaporation head (36).

The evaporation head (36) (see FIGS. 2A to 6) comprises connectors (72) configured to hold all three concentrically arranged tubes (19; 20; 21) by one of its ends and provide concentric arrangement. The evaporation head (36) comprises brine inlets (68) positioned around the evaporation head (36) so that the brine (65) on the holding plate (201) can flow into the evaporation head (36) and further down along the surfaces of the tubes (19; 20; 21), especially along the inner and outer surfaces of the inner tube (20) and the inner and outer surfaces of the intermediate tube (21) and along the inner surface of the outer tube (19). The evaporation head (36) comprises air inlets (61; 63; 64)—a central pipe air inlet (64), an intermediate pipe air inlet (63) and an outer pipe air inlet (61). The central pipe air inlet (64) extending through the evaporation head (36) so that the air can flow through the evaporation head (36) and further into the inner tube (20). The intermediate pipe air inlet (63) extending through the evaporation head (36) so that the air can flow through the evaporation head (36) and further into the intermediate tube (21). The outer pipe air inlet (61) extending through the evaporation head (36) so that the air can flow through the evaporation head (36) and further into the outer tube (19). The evaporation head (36) also comprises brine channels for guiding the brine (65) from the brine inlets (68) to the concentrically arranged tubes (19; 20; 21).

The fan (23) is configured to maintain the pressure within the inner volume of the evaporation container (300) in the range of 180 to 300 Pa to maintain the air flow (210; 14-18)

in gaps between the concentrically arranged tubes (19; 20; 21) of the evaporation unit (200) to facilitate evaporation of a water in the brine (65).

The evaporation unit (200) (see FIG. 4) comprises flow stabilizing rings (69). One flow stabilizing ring (69) is arranged on the inner surface of the outer tube (19), another flow stabilizing ring (69) is arranged on the outer surface, yet another flow stabilizing ring (69) is arranged on the inner surface of the intermediate tube (21), and another flow stabilizing ring (69) is arranged on the outer surface and on the inner surface of the inner tube (20).

Figure 7:
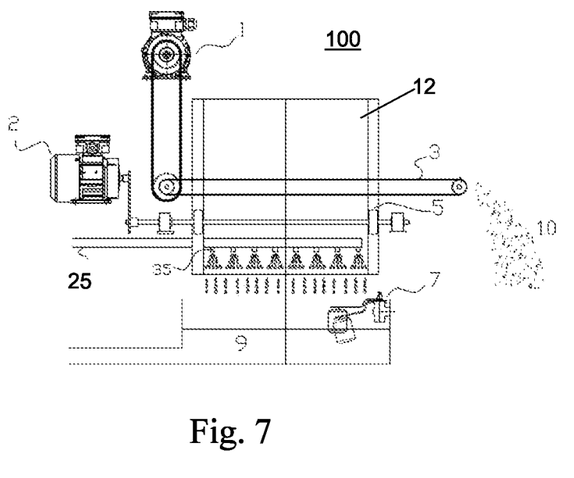
FIG. 7 is a close up view of a salt separation unit (100) as seen in FIG. 1.
Figure 8:
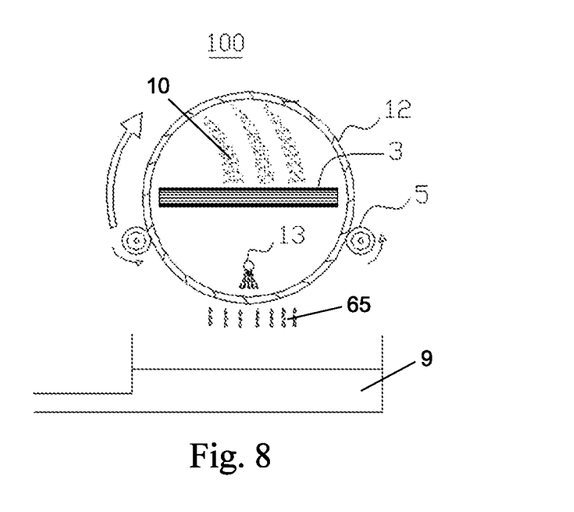
FIG. 8 is a schematic front view of the salt separation unit (100) as seen in FIGS. 1 and 7.

The salt separation unit (100) comprises a rotating drum (12), a brine feed pipe (25), where part (13) of the brine feed pipe (25) is arranged within the rotating drum (12) so that the brine (65) through its nozzles (35) is fed into the rotating drum (12). The rotating drum (12) is supported by rollers (5). The rollers (5) are driven by a drum rotation motor (2) so that the rollers (5) rotate said drum (12). The salt separation unit (100) further comprises a conveyor belt (3) arranged within the rotating drum (12) in the middle area thereof so that the crystalized salt (10) is transferred from the rotating drum (12) to the conveyor belt (3) and outside from the salt separation unit (100) for collection of said salt (10). The conveyor belt (3) is driven by a conveyor motor (1). The salt separation unit (100) further comprises a brine collection tank (9) positioned underneath the rotating drum (12) so that the brine (65) that went through the rotating drum (12) can be collected. The brine collection tank (9) is fluidly connected to the brine tank (30; 31) and to the evaporation container (300) (see FIGS. 7 and 8).

While the invention may be susceptible to various modifications and alternative forms, specific embodiments of which have been shown by way of example in the figures and have been described in detail herein, it should be understood that the invention is not intended to be limited to the particular forms disclosed. Rather, the invention includes all modifications, equivalents, and alternatives falling within the scope of the invention as defined by the following claims.

LIST OF REFERENCES

1—a conveyor motor;
2—a drum rotation motor;
3—a conveyor belt;
5—a roller;
7—a float valve;
9—a brine collection tank;
10—a salt;
12—a rotating drum;
13—a part of a brine feed pipe within a salt separation unit;
14—an air flow;
15—an air flow;
16—an air flow;
17—an air flow;
18—an air flow;
19—an outer tube of an evaporation unit;
20—an inner tube of an evaporation unit;
21—an intermediate tube of an evaporation unit;
23—a fan;
25—a brine feed pipe;
26—a brine feed pipe;
27—a brine feed pump;
28—a brine feed pipe;
29—inclined container floor;
30—a brine tank;
31—a brine tank;
32—a support structure;
33—a recirculation pump;
34—a recirculation pipe;
35—a nozzle;
36—an evaporation head;
61—an outer pipe air inlet;
62—a brine channel;
63—a intermediate pipe air inlet;
64—a central pipe air inlet;
65—a brine;
66—a holding plate;
67—a frame of a container;
68—a brine inlet of an evaporation head;
69—a flow stabilizing ring;
70—an enclosure of a container;
72—a connector o fan evaporation head;
100—a salt separation unit;
200—an evaporation unit;
210—an air flow; and
300—an evaporation container.

The invention claimed is:

1. An evaporation container (300) comprising a frame (67) and an enclosure (70) enclosing an inner volume of the evaporation container (300), wherein the evaporation container (300) further comprises a holding plate (66) positioned in an upper part of the evaporation container (300), wherein the evaporation container (300) is configured to receive a brine (65) on its holding plate (201), and wherein the evaporation container (300) comprises:

evaporation units (200), wherein each of the evaporation unit (200) comprises:
three concentrically arranged tubes (19; 20; 21)—an inner tube (20), an intermediate tube (21) and an outer tube (19);
an evaporation head (36) comprising:
connectors (72) configured to hold all three concentrically arranged tubes (19; 20; 21) by a respective end of each tube and provide concentric arrangement,
brine inlets (68) positioned around the evaporation head (36) so that the brine (65) on the holding plate (201) can flow into the evaporation head (36) and further down along inner and outer surfaces of the inner tube (20), inner and outer surfaces of the intermediate tube (21), and along Inner surface of the outer tube (19);
a central pipe air inlet (64) extending through the evaporation head (36) so that air can flow through the evaporation head (36) and further into the inner tube (20);
an intermediate pipe air inlet (63) extending through the evaporation head (36) so that the air can flow through the evaporation head (36) and further into the intermediate tube (21); and
an outer pipe air inlet (61) extending through the evaporation head (36) so that the air can flow through the evaporation head (36) and further into the outer tube (19); and
a fan (23), wherein the fan (23) is configured to maintain a pressure within the inner volume of the evaporation container (300) in a range of 180 to 300 Pa to maintain an air flow (210; 14-18) in gaps between the concentrically arranged tubes (19; 20; 21) of the evaporation unit (200) to facilitate evaporation of a water in the brine (65).

2. The evaporation container (300) according to claim 1, characterized in that each of the evaporation units (200) further comprises flow stabilizing rings (69), wherein the flow stabilizing rings (69) are arranged on the inner surface of the outer tube (19), on the outer surface and on the inner surface of the intermediate tube (21), and on the outer surface and on the inner surface of the inner tube (20).

3. The evaporation container (300) according to claim 1, characterized in that a diameter of the inner tube (20) is in a range of 100 to 120 mm.

4. The evaporation container (300) according to claim 1, characterized in that a length of each of the evaporation units (200) and its respective inner tube (20), intermediate tube (21) and the outer tube (19) is in range of 1.5 m to 2.5 m.

5. The evaporation container according to claim 1, characterized in that the evaporation container further comprises an inclined container floor(29) facilitating a drainage of brine (65) that drops from the evaporation units (200).

6. A brine recycling plant comprising the evaporation container (300) according to claim 1, wherein the brine recycling plant further comprises:
   a brine tank (30; 31) configured to contain a brine (22) and fluidly connected to the evaporation container (300) so that the brine (65) can flow from the brine tank (30; 31) to the evaporation container (300),
   a salt separation unit (100) fluidly connected to the evaporation container (300) so that the brine (65) can flow from the evaporation container (300) to the salt separation unit (100), wherein the salt separation unit (100) comprises:
   a rotating drum (12),
   a brine feed pipe (25), where part of the brine feed pipe (25) is arranged within the rotating drum (12) so that the brine (B) is fed into the rotating drum (12),
   a conveyor belt (3) arranged within the rotating drum (12) in a middle area thereof so that crystalized salt (10) is transferred from the rotating drum (12) to the conveyor belt (3) and outside of the salt separation unit (100) for collection; and
   a brine collection tank (9) positioned underneath the rotating drum (12) so that the brine (65) that passes through the rotating drum (12) can be collected, wherein the brine collection tank (9) is fluidly connected to the brine tank (30; 31) and to the evaporation container (300).

\* \* \* \* \*